Dec. 21, 1943.   P. HERMSMEYER   2,337,104
ROAD SCRAPER ATTACHMENT FOR TRACTORS
Filed April 7, 1942   3 Sheets-Sheet 1

Inventor
PAUL HERMSMEYER,
By Clarence A. O'Brien
and Harvey B. Jacobson
Attorneys Dec. 21, 1943.   P. HERMSMEYER   2,337,104
ROAD SCRAPER ATTACHMENT FOR TRACTORS
Filed April 7, 1942   3 Sheets-Sheet 2
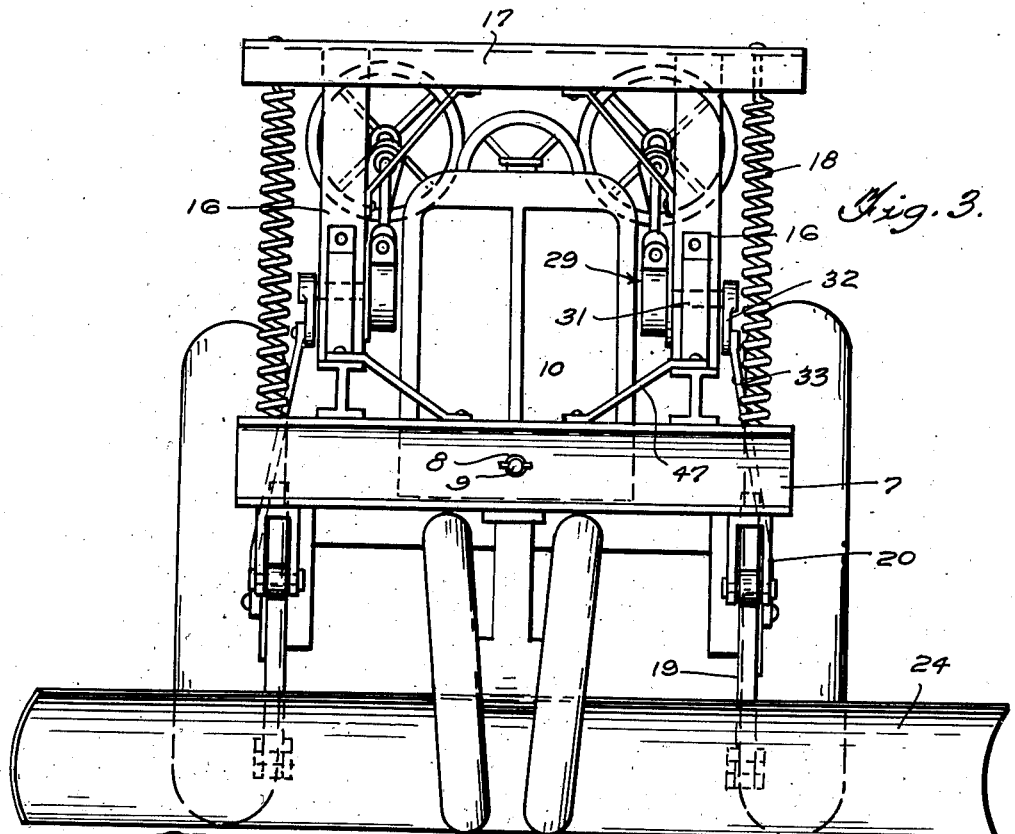
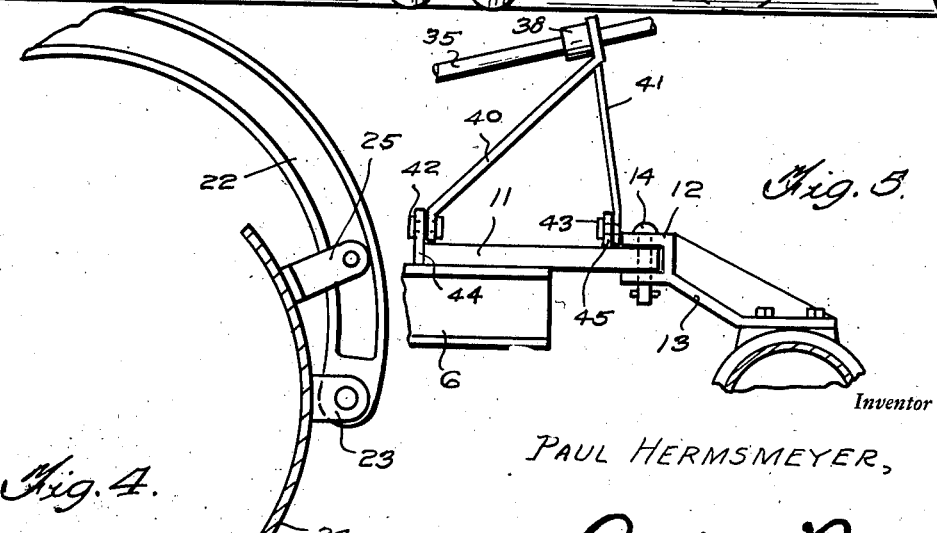
Inventor
PAUL HERMSMEYER,
By

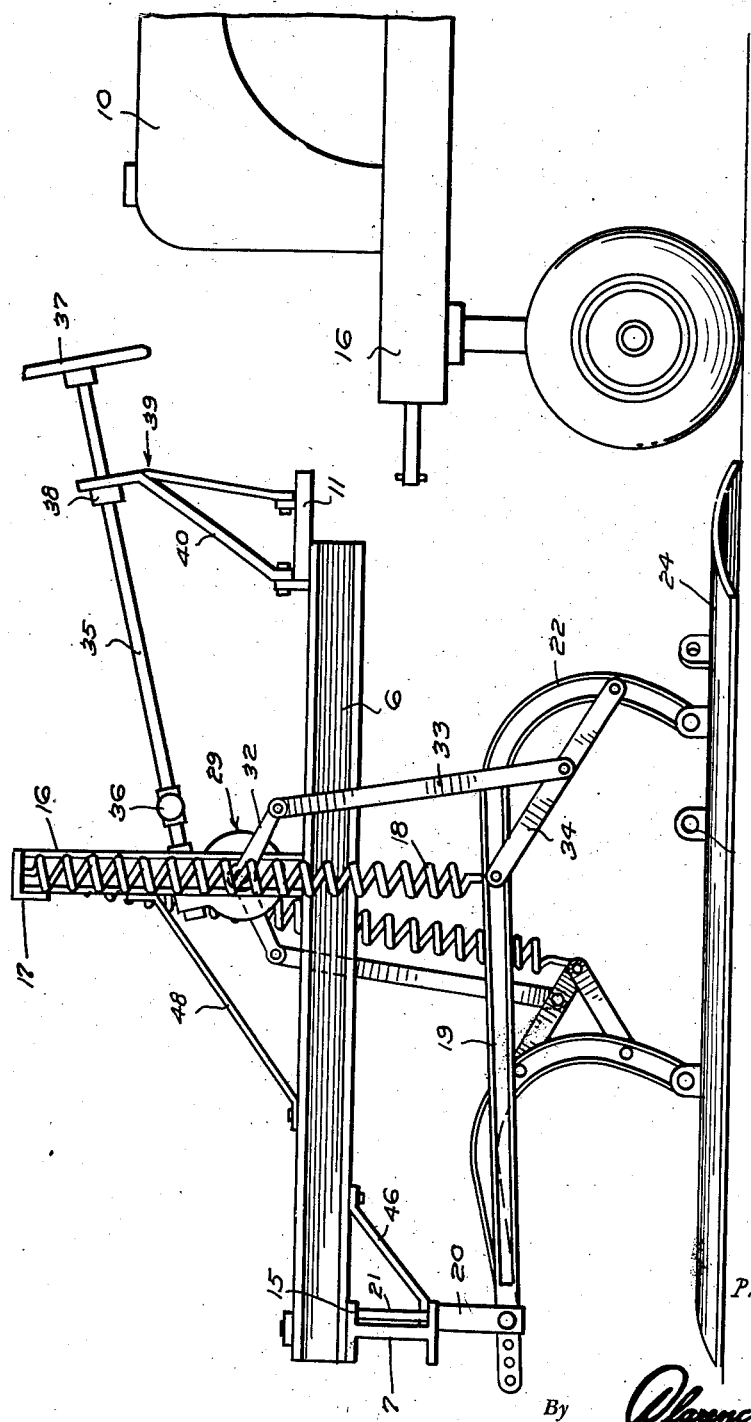

Patented Dec. 21, 1943

2,337,104

UNITED STATES PATENT OFFICE 2,337,104

ROAD SCRAPER ATTACHMENT FOR TRACTORS

Paul Hermsmeyer, Scotia, Nebr.

Application April 7, 1942, Serial No. 438,030

5 Claims. (Cl. 37—155)

The present invention relates to new and useful improvements in road scrapers or graders embodying a unitary structure adapted for easily and quickly attaching in position at the front end of a tractor and embodying a frame to which the moldboard of the scraper is attached and arranged in position, when detached from the tractor, to permit the front end of the tractor to run between the frame for attaching to the tractor with the moldboard positioned thereunder.

A further object of the invention is to provide a scraper attachment of this character of simple and practical construction, which is strong and durable, which may be attached to and detached from the tractor without necessitating any heavy lifting on the part of the operator and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a front elevational view.

Figure 4 is a transverse sectional view through the moldboard showing one of the beams attached thereto.

Figure 5 is a fragmentary side elevational view of the connection for the rear end of the scraper frame, and Figure 6 is a side elevational view of the scraper attachment shown in position detached from the tractor.

Figure 1:
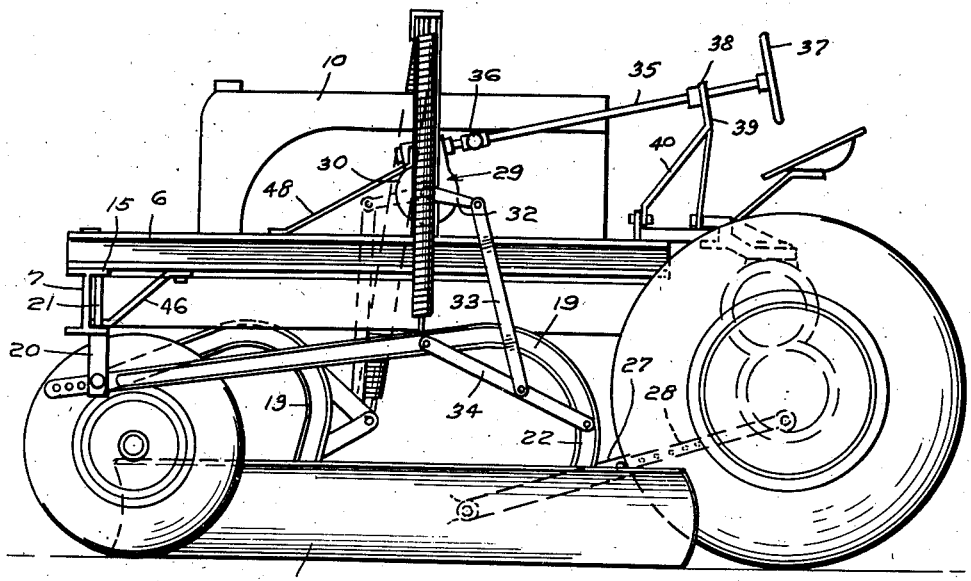
Figure 1 is a side elevational view showing the scraper attached to the tractor.

Referring now to the drawings in detail, wherein for the purpose of illustration I have disclosed a preferred embodiment of the invention, the numeral 5 designates a frame generally which includes a pair of longitudinal frame members 6, preferably of I-beam construction in cross-section and which rest upon and are secured to a transverse I-beam frame member 7.

The transverse frame member 7 is provided with an opening 8 through which the crank shaft 9 of the tractor 10 is inserted when the tractor is moved forwardly between the frame members 6 and projecting rearwardly at the rear ends of each of the frame members 6 is a connecting plate 11 adapted to be received between the bifurcated front end 12 of a bracket 13 of conventional construction usually secured to the tractor above the rear axle thereof, the plate 11 being detachably secured in position to the bracket by means of a pin 14, the bracket thus supporting the rear end of the frame on the tractor.

The upper flange 15 of the cross-member 7 is adapted to rest upon the front end of the tractor 10 to thus support the front end of the scraper frame in position on the tractor.

Rising from each of the longitudinal frame members 6, intermediate its ends, is an upright 16, the two uprights at the opposite sides of the frame being connected at their upper ends by a cross-member 17, the ends of the cross member projecting outwardly from each side of the uprights, as shown to advantage in Figure 3 of the drawings.

A pair of coil springs 18 extend downwardly from the ends of the cross-members 17 and these springs are connected at their lower ends to a pair of beams 19 extending longitudinally of the tractor, the beams being pivotally connected at their front ends to yokes 20, each having a shaft 21 extending upwardly therefrom for pivotally mounting in the flanges of the cross frame members 7. The rear ends of the beams 19 are curved downwardly, as shown at 22, and are pivotally connected to ears 23 formed on the rear surface at an intermediate portion of a moldboard 24 which is curved transversely, as shown in Figure 4 of the drawings. The upper edge of the moldboard is also connected to the curved portion 22 of the beam at a point above the lower edge of the latter by means of brackets 25 to secure the moldboard against pivotal movement while the scraper is in use.

Figure 2:
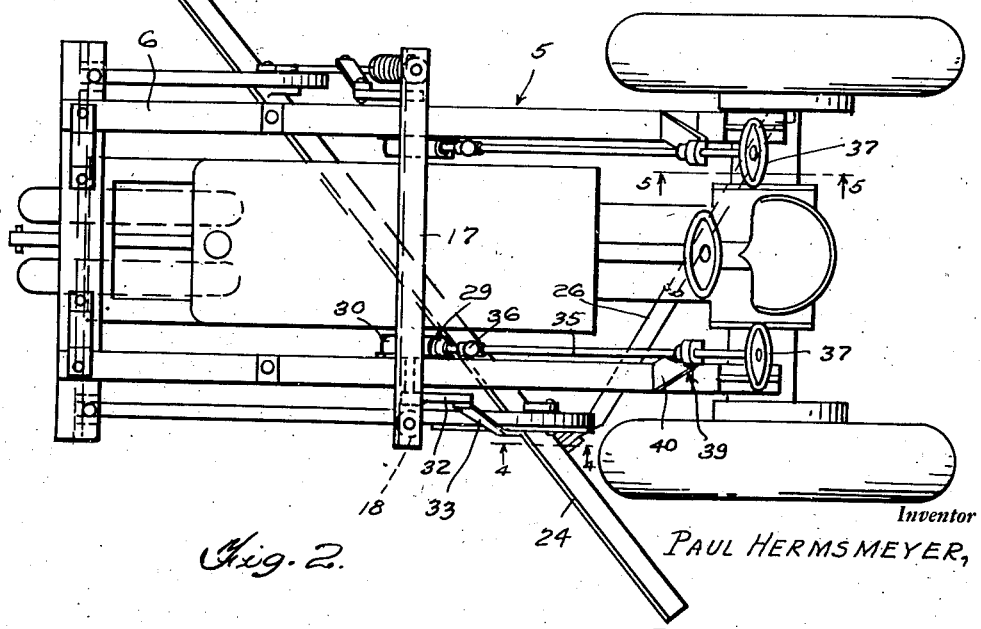
Figure 2 is a top plan view.

The moldboard is supported in an inclined position beneath the tractor, as shown to advantage in Figure 2 of the drawings, and a brace member 26 is connected to the moldboard adjacent its rearwardly inclined end and extends diagonally under the tractor for attaching to the rear portion thereof, the brace 26 preferably being constructed of adjustable sections 27 and 28, as shown in Figure 1 of the drawings.

The moldboard is vertically adjusted by means of a conventional lift mechanism, designated generally at 29 which includes a gear housing 30 attached to each of the uprights 16 and from which a shaft 31 projects having an arm 32 extending therefrom to the outer end of which is attached a link 33 extending downwardly and with its lower end pivotally attached to a brace 34 connected at spaced points to the beam 19 at the junction of the curved portion 22 thereof with the beam.

A conventional gear mechanism is mounted in the gear housing 30 and is operated by a shaft 35 having a Universal joint 36 therein, the shaft being provided with a manipulating wheel 37 at its rear end.

The shaft 35 is journaled in a bearing 38 supported on the upper end of a post 39, which includes downwardly diverging legs 40 and 41 pivoted at their lower ends on bolts 42 and 43, respectively, the bolt 42 being mounted in a lug 44 secured adjacent the front end of the plate 11 and the bolt 43 being mounted in a lug 45 secured adjacent the rear end of said plate.

Each of the beams 19 is provided with an independent lift mechanism so that either end of the moldboard may be vertically adjusted.

By detaching the bracket 25 of the moldboard from the curved portion 22 of the beam, the moldboard may be tilted downwardly so that its longitudinal edges will rest upon the surface of the ground, as shown to advantage in Figure 6 of the drawings, and by removing the pins 14 connecting the rear ends of the longitudinal frame members 6 to the tractor and also detaching the brace member 26, the tractor may be backed out from between the frame members 6 and the scraper mechanism will then be substantially balanced and supported in an upright position while the tractor is being removed therefrom and may be maintained in such position when the tractor is again driven forwardly over the moldboard into a position between the frames.

Suitable brace members 46 extend from the underside of the frame members 6 to the cross frame member 7 and suitable brace members 47 may also extend from the upper side of the frame members 6 inwardly to the cross frame members 7, as shown in Figure 3 of the drawings. Likewise, braces 48 may be provided between the longitudinal frame members 6 and the uprights 16.

By loosening the bolts 42 and 43, the legs 40 and 41 of the post member 39 may be swung outwardly to prevent interference of the wheel 37 with the tractor while the latter is being moved into and out of position with respect to the scraper attachment.

It is believed the details of construction, manner of use and operation of the device will be readily understood from the foregoing without further detailed explanation.

Having thus described the invention what I claim is:

1. A scraper attachment for tractors comprising a scraper frame including a pair of longitudinal frame members positioned at opposite sides of the tractor and a transverse frame member connecting the front ends of said longitudinal frame members and adapted to rest upon the front end of a tractor, a support rising from the longitudinal frame members, a pair of beams pivoted at their front ends to the scraper frame, a moldboard pivoted at the rear ends of the beams, means normally securing the moldboard against movement, a lift mechanism connecting the beams to the support, and means for detachably connecting the rear ends of the longitudinal frame members to the rear portions of the tractor.

2. A scraper attachment for tractors comprising a scraper frame including a pair of longitudinal frame members positioned at opposite sides of the tractor and a transverse frame member connecting the front ends of said longitudinal frame members and adapted to rest upon the front end of a tractor, a support rising from the longitudinal frame members, a pair of beams pivoted at their front ends to the scraper frame, a moldboard pivoted at the rear ends of the beams, means normally securing the moldboard against movement, a lift mechanism connecting the beams to the support, said moldboard being arcuate in cross-section and disposed transversely beneath the tractor, and means for detachably connecting the rear ends of the longitudinal frame members to the rear portions of the tractor, said moldboard being adapted to lie upon the ground and to support the frame when detached from the tractor in a position for the movement of the tractor into and out of position between the longitudinal frame members.

3. A scraper attachment for tractors comprising a scraper frame including a pair of longitudinal frame members positioned at opposite sides of the tractor and a transverse frame member connecting the front ends of said longitudinal frame members and adapted to rest upon the front end of a tractor, a support rising from the longitudinal frame members, a pair of beams pivoted at their front ends to the scraper frame, a moldboard pivoted at the rear ends of the beams, means for detachably securing the moldboard against pivotal movement when the frame is supported on the tractor, said moldboard being arcuate in cross-section and disposed in an inclined transverse position beneath the tractor and adapted to lie with its longitudinal edges resting on the ground when the frame is detached from the tractor for supporting the frame in its normal position for movement of the tractor into and out of position between the longitudinal frame members, a lift mechanism carried by the support and operatively connected to the beams, and means for detachably connecting the rear ends of the longitudinal frame members to the rear portion of the tractor.

4. A scraper attachment for tractors comprising a scraper frame including a pair of longitudinal frame members positioned at opposite sides of the tractor and a transverse frame member connecting the front ends of said longitudinal frame members and adapted to rest upon the front end of a tractor, a support rising from the longitudinal frame members, a pair of beams pivoted at their front ends to the scraper frame, a moldboard pivoted at the rear ends of the beams, means for detachably securing the mold board against pivotal movement when the frame is supported on the tractor, said moldboard being arcuate in cross-section and disposed in an inclined transverse position beneath the tractor and adapted to lie with its longitudinal edges resting on the ground when the frame is detached from the tractor for supporting the frame in its normal position for movement of the tractor into and out of position between the longitudinal frame members, a lift mechanism carried by the support and operatively connected to the beams, counter-balancing spring means carried by the support and connected to the beams, and means for detachably connecting the rear ends of the longitudinal frame members to the rear portion of the tractor.

5. A scraper attachment for tractors comprising a scraper frame including a pair of longitudinal frame members positioned at opposite sides of the tractor and a transverse frame member connecting the front ends of said longitudinal frame members and adapted to rest upon the front end of a tractor, a support rising from.

the longitudinal frame members, a pair of beams pivoted at their front ends to the scraper frame, a moldboard pivoted at the rear ends of the beams, means for detachably securing the moldboard against pivotal movement when the frame is supported on the tractor, said moldboard being arcuate in cross-section and disposed in an inclined transverse position beneath the tractor and adapted to lie with its longitudinal edges resting on the ground when the frame is detached from the tractor for supporting the frame in its normal position for movement of the tractor into and out of position between the longitudinal frame members, a lift mechanism carried by the support and operatively connected to the beams, and including a manually operated shaft for each end of the moldboard, a transversely swingable support for each shaft, counter-balancing spring means connecting the beams to the first-named support, and means for detachably connecting the rear ends of the longitudinal frame members to the rear portion of the tractor.

PAUL HERMSMEYER.